(12) United States Patent
Hampton

(10) Patent No.: US 11,136,085 B2
(45) Date of Patent: Oct. 5, 2021

(54) LUGGAGE RACK WING

(71) Applicant: Christian K Hampton, San Francisco, CA (US)

(72) Inventor: Christian K Hampton, San Francisco, CA (US)

( * ) Notice: Subject to any disclaimer, the term of this patent is extended or adjusted under 35 U.S.C. 154(b) by 0 days.

(21) Appl. No.: 16/821,045

(22) Filed: Mar. 17, 2020

(65) Prior Publication Data
US 2021/0078658 A1 Mar. 18, 2021

Related U.S. Application Data

(60) Provisional application No. 62/899,381, filed on Sep. 12, 2019.

(51) Int. Cl.
*B62J 7/00* (2006.01)

(52) U.S. Cl.
CPC ........................................ *B62J 7/00* (2013.01)

(58) Field of Classification Search
CPC ........ B62J 7/00; B62J 7/04; B62J 7/08; B62J 9/27
See application file for complete search history.

(56) References Cited

U.S. PATENT DOCUMENTS

| | | | | |
|---|---|---|---|---|
| 3,795,354 A | * | 3/1974 | Stippich | B62J 7/08 224/418 |
| 4,174,796 A | * | 11/1979 | Nakamura | B62J 7/04 224/413 |
| 4,230,245 A | * | 10/1980 | Pold | B62J 7/04 224/413 |
| 4,257,544 A | * | 3/1981 | Dierkes | B62J 7/04 224/412 |
| 4,266,703 A | * | 5/1981 | Litz | B62J 7/04 224/443 |
| 4,311,261 A | * | 1/1982 | Anderson | B62J 1/14 224/418 |
| 4,440,330 A | * | 4/1984 | Goodman | B62J 1/28 224/452 |
| 4,480,773 A | * | 11/1984 | Krauser | B62J 7/00 224/443 |
| 4,501,384 A | * | 2/1985 | Itoh | B62J 9/00 224/413 |
| 4,993,731 A | * | 2/1991 | Fuller | B62J 1/28 280/202 |
| 5,558,260 A | * | 9/1996 | Reichert | B62J 1/14 224/413 |

(Continued)

*Primary Examiner* — Brian D Nash
(74) *Attorney, Agent, or Firm* — Donald R. Boys; Central Coast Patent Agency LLC

(57) ABSTRACT

A luggage rack for a motorcycle has a central body, a first wing element to one side of the central body, with a first fin extending at a right angle from the first wing element at an end of the first wing element, a second wing element to an opposite side of the central body, with a second fin extending at substantially a right angle from the second wing element at an end of the second wing element, a first and a second planar panel, spaced equally apart, parallel, and oriented vertically, extending downward and forward, each planar panel having a first notch facing forward at the forward extremity, and each planar panel having a second notch at a position rearward from the first notch, the second notch for each panel having a spring-loaded locking mechanism.

7 Claims, 2 Drawing Sheets

(56) References Cited

U.S. PATENT DOCUMENTS

| | | | | |
|---|---|---|---|---|
| 5,658,035 | A * | 8/1997 | Armstrong | B62J 17/04 296/78.1 |
| 5,664,715 | A * | 9/1997 | Gogan | B62J 7/04 224/413 |
| 5,667,232 | A * | 9/1997 | Gogan | B62J 1/28 280/202 |
| 5,732,965 | A * | 3/1998 | Willey | B62J 17/04 180/219 |
| 5,762,249 | A * | 6/1998 | Hann | B62J 7/04 224/413 |
| 6,347,804 | B1 * | 2/2002 | Seibel | B62J 1/12 180/219 |
| 6,443,344 | B1 * | 9/2002 | Nicosia | B62J 1/28 224/413 |
| 6,484,914 | B1 * | 11/2002 | Willey | B62J 1/28 224/413 |
| 7,150,382 | B2 * | 12/2006 | Zickefoose | B62J 11/00 224/423 |
| 7,175,220 | B2 * | 2/2007 | Kashiwagi | B62J 1/28 280/288.4 |
| 7,275,787 | B1 * | 10/2007 | Grove | B62J 1/28 297/215.12 |
| 7,654,496 | B2 * | 2/2010 | Sharpe | B62J 1/28 248/222.11 |
| 7,946,632 | B1 * | 5/2011 | Mueller | B62J 1/28 292/1 |
| 8,720,757 | B2 * | 5/2014 | Salisbury | B62K 11/00 224/413 |
| 8,888,059 | B2 * | 11/2014 | Kohberg | B60R 11/00 248/201 |
| 8,925,965 | B2 * | 1/2015 | Pecora | B60R 9/06 280/769 |
| 8,985,416 | B2 * | 3/2015 | Schanz | B62J 11/00 224/413 |
| 10,065,698 | B1 * | 9/2018 | Sliwa | B62J 9/20 |
| 10,144,472 | B2 * | 12/2018 | Bunyer | B62K 11/04 |
| 10,378,247 | B2 * | 8/2019 | Bunyer | B62J 9/20 |
| 2005/0092797 | A1 * | 5/2005 | Takahashi | B60R 11/06 224/401 |
| 2005/0150921 | A1 * | 7/2005 | Schneider | B62J 9/00 224/413 |
| 2008/0083801 | A1 * | 4/2008 | Knoch | B62J 9/26 224/413 |
| 2010/0170924 | A1 * | 7/2010 | Johnson | B62J 7/08 224/413 |
| 2010/0243691 | A1 * | 9/2010 | Salisbury | B62J 1/12 224/413 |
| 2013/0134747 | A1 * | 5/2013 | Reinhardt | B62J 9/20 297/188.05 |
| 2014/0167387 | A1 * | 6/2014 | Komatsu | B62J 7/00 280/288 |
| 2014/0191006 | A1 * | 7/2014 | Schanz | B62J 7/04 224/413 |
| 2015/0203165 | A1 * | 7/2015 | Bunyer | B62K 11/04 224/413 |

* cited by examiner

LUGGAGE RACK WING

CROSS-REFERENCE TO RELATED DOCUMENTS

The instant application claims priority to Provisional Application 62/899,381, filed Sep. 12, 2019. All disclosure of the parent application is incorporated at last by reference.

BACKGROUND OF THE INVENTION

1. Field of the Invention

The instant invention is in the technical area of motorcycle accessories.

2. Description of Related Art

There exist in the art various forms of add-ons for luggage racks for motorcycles, but not like this one. The present invention fills an unmet need in the art, providing an add-on for the luggage rack that is both pleasing and useful.

BRIEF SUMMARY OF THE INVENTION

In one embodiment of the invention a luggage rack for a motorcycle is provided, comprising a central body having a substantially horizontal orientation about a central vertical plane, a first wing element extending substantially horizontally to one side of the central body at a right angle to the central plane, with a first fin extending at substantially a right angle from the first wing element at an end of the first wing element away from the central body, a second wing element extending substantially horizontally to a side of the central body opposite the first wing element, at a right angle to the central plane, with a second fin extending at substantially a right angle from the second wing element at an end of the second wing element away from the central body, a first and a second planar panel, spaced equally apart about the central plane, parallel, and oriented vertically, extending downward and forward from the underside of the body, each planar panel having a first notch facing forward at the forward extremity, and each planar panel having a second forward-facing notch at a position rearward from the first notch, the second notch for each panel having a spring-loaded locking mechanism, the first and second planar panels for joining the luggage rack to the rear of a motorcycle.

In one embodiment the central body and the extending wing elements form a base for carrying luggage or other cargo. Also, in one embodiment the luggage rack further comprises attachment elements for securing luggage or cargo to the base. In one embodiment the fins extend upward from the wing elements. And in one embodiment the fins extend downward from the wing elements.

In one embodiment the luggage rack further comprises an enclosure within the central body with a lid, providing storage within the enclosure. In one embodiment the wing elements are shaped to provide an upward force on the motorcycle to which the luggage rack is assembled. And in one embodiment the wing elements are shaped to provide a downward force on the motorcycle to which the luggage rack is assembled.

DETAILED DESCRIPTION OF THE INVENTION

Figure 1:
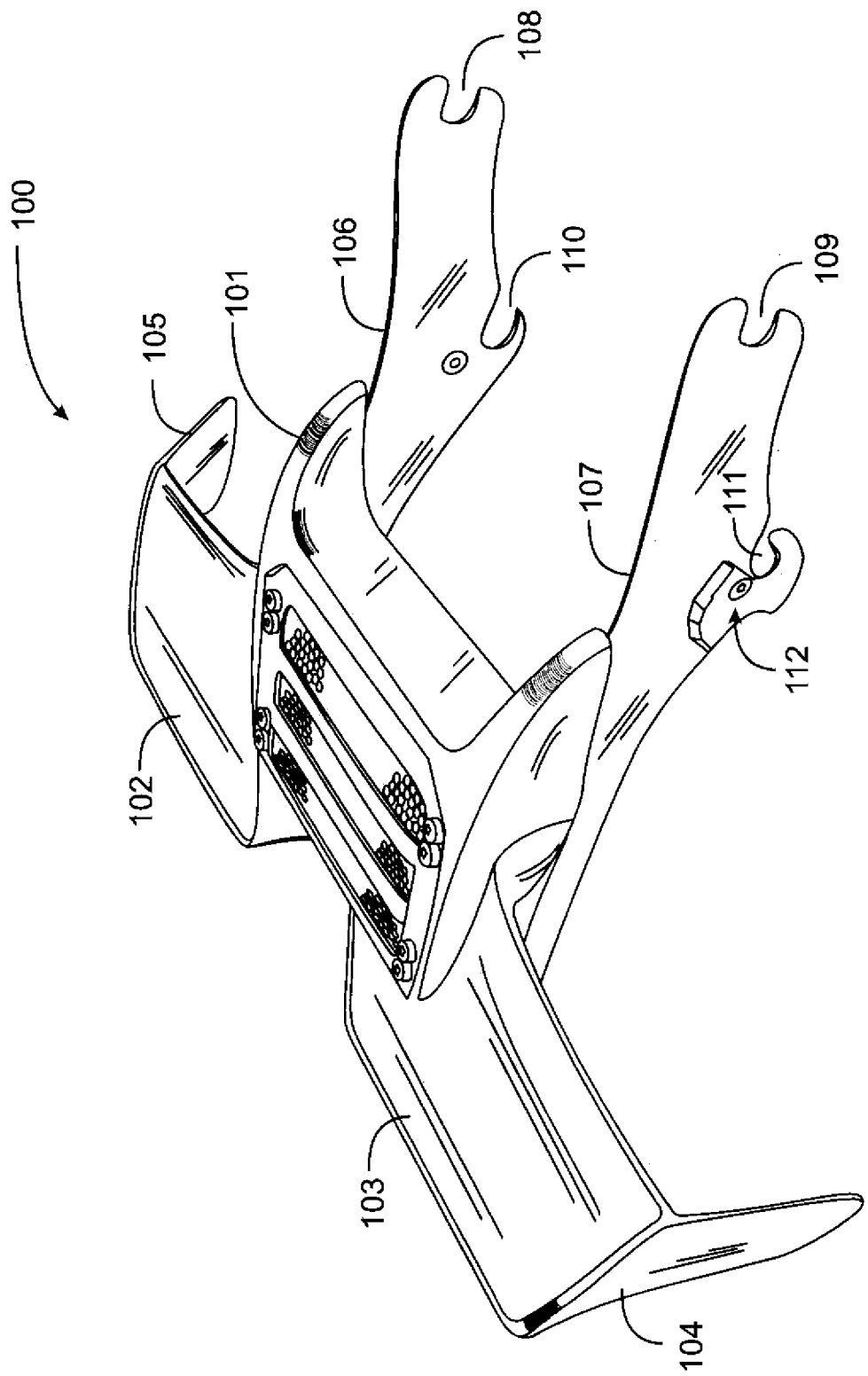
FIG. 1 is a perspective view of a luggage rack wing in an embodiment of the present invention.

FIG. 1 is a perspective view of a luggage rack wing 100 according to one embodiment of the present invention. Wing 100 comprises a body portion 101 central to the apparatus, to which other elements are attached. Body portion 101 in this embodiment has a roughly rectangular part in a horizontal plane, and has curved extensions facing forward, which is in the direction of two planer panels 106 and 107, their planes substantially vertical and parallel, that are spaced apart and affixed to body portion 101 at a lower extremity. Panels 106 and 107 are for joining the luggage rack wing to the rear wheel of a motorcycle. Each panel 106 and 107 has a notch (108 and 109) at the forward extremity, and a similar notch (110 and 111) at another position further to the rear, as shown. The motorcycle luggage rack has cylindrical extensions to each side spaced such that notches 108 and 109 may engage a forward pair of these extensions, and notches 110 and 111 may engage a rearward pair.

Each panel 106 and 107 has a pivoted, spring-loaded latch 112, positioned such that as notches 110 and 111 engage a cylindrical extension of the luggage rack, the latches 112 close, and the luggage rack wing is thus secured to the rear of the motorcycle.

In the instant embodiment there are two wings 102 and 103, extending to each side of the body, and two fins. Fin 104 extends downward from wing 103 at an end away from the body, and fin 105 extends downward from wing 102 at an end away from the body. In an alternative embodiment the fins may extend upward from the wings, rather than downward.

Figure 2:
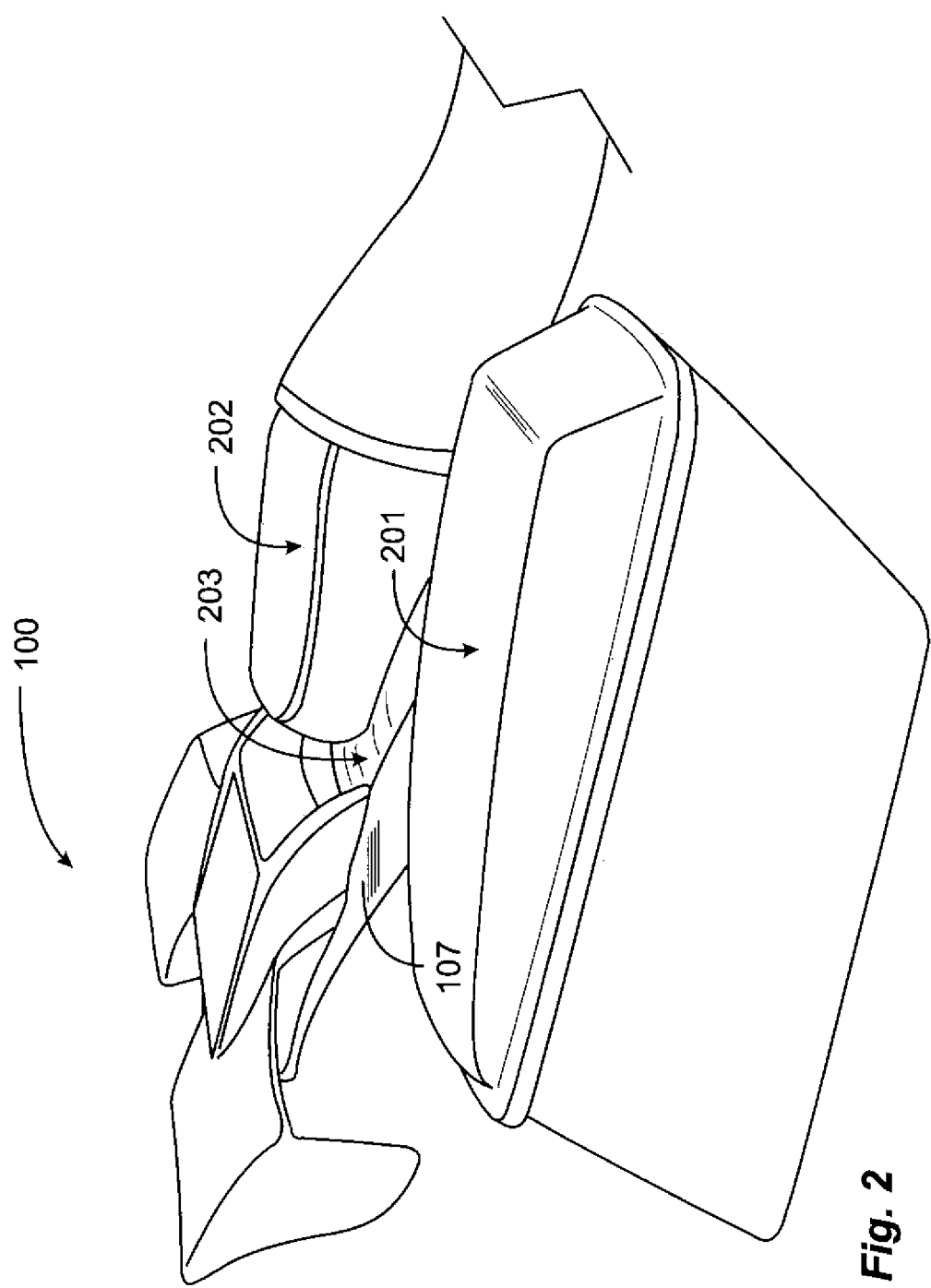
FIG. 2 shows the luggage rack wing of FIG. 1 engaged to a rear fender and saddlebags of a motorcycle.

FIG. 2 illustrates luggage rack wing 100 assembled to a motorcycle. Element 201 is one of a set of two saddlebags, one attached to the frame or the rear fender of the motorcycle on each side. The saddlebag on the opposite side is not seen. A rearward projection 202 of the seat of the motorcycle is shown, positioned over rear fender 203, a small portion of which is seen in the figure below the seat 202. Planar panel 107, shown in FIG. 1 as one of two such panels 106 and 107, may be seen projecting forward from luggage rack wing 100, and down between saddle bag 201 and the fender of the motorcycle. The cylindrical extensions referred to above, to which notches 108-111 engage, are connections from the motorcycle to the saddlebags. The luggage rack wing may be assembled to the motorcycle by inserting panels 106 and 107 from the rear, between the saddlebags and the rear fender, and engaging forward notches 108 and 109 with two of the connections from the fender to the saddlebags, then engaging the rear notches with other of the extensions until the spring-loaded latches engage and lock. The luggage rack may be disengaged and removed by opening latches 112 and pulling the luggage rack away from the motorcycle.

Wing 100 mounted to the motorcycle is to assist with a smooth ride, by action of the wings, but also serves as a luggage mount, a hat holder and/or a sign and plaque holder. In some circumstances the wing also provides ride stability for the motorcycle. In some embodiments wing 100 may be provided with attachment elements, such as eyehooks, for example, to which bungee cords or other holding elements may be attached. In another embodiment the rectangular part of body portion 101 of the luggage rack wing has sufficient thickness to provide an enclosure with a lid that may be opened to accept items small enough to fit inside, after which the lid may be closed.

In preferred embodiments of the invention the wing extensions 102 and 103 from body 101 are shaped as are wings in most applications, with a curvature on one side that provides a longer path for air flow than on the opposite side, creating a reduced pressure on the side with the longer air flow path. The reduced pressure is responsible for the lift that the wing provides.

In some embodiments wing extensions 102 and 103 are shaped to provide a lifting force on the luggage rack wing, and hence on the rear of the motorcycle. In some other embodiments the wing extensions 102 and 103 are shaped to provide a downward force on the rear of the motorcycle, and may enhance traction for the rear tire of the motorcycle in use. Fins 104 may provide horizontal stability for the motorcycle in use.

The skilled person will understand that the embodiments described above with reference to the figures are exemplary, and that the details of the luggage rack wing may vary from the specific descriptions within the scope of the invention. The wing extensions may, for example, be longer or shorter. The scope of the invention is limited only by the claims.

I claim:

1. A luggage rack for a motorcycle, comprising:
   a central body symmetrical about a central vertical plane;
   a first wing element extending horizontally to one side of the central body, the first wing element shaped as a conventional aircraft wing, having a longer path in a direction of movement of the motorcycle, over an upper or lower side of the wing than over the opposite side;
   a second wing element extending horizontally to a side of the central body opposite the first wing element, the second wing element also shaped as a conventional aircraft wing, having a longer path in a direction of movement of the motorcycle, over an upper or lower side of the wing than over the opposite side; and
   a first and a second planar panel, spaced equally apart about the central plane, parallel, and oriented vertically, extending downward and forward from the underside of the body, each planar panel having a first notch facing forward at the forward extremity, and each planar panel having a second forward-facing notch at a position rearward from the first notch, the second notch for each panel having a spring-loaded locking mechanism, the first and second planar panels for joining the luggage rack to the rear of a motorcycle.

2. The luggage rack of claim 1 wherein the central body and the extending wing elements form a base for carrying luggage or other cargo.

3. The luggage rack of claim 2 further comprising attachment elements for securing luggage or cargo to the base.

4. The luggage rack of claim 1 further comprising an enclosure within the central body with a lid, providing storage within the enclosure.

5. The luggage rack of claim 1 further comprising a first fin extending at substantially a right angle from the first wing element at an end of the first wing element away from the central body, and a second fin extending at substantially a right angle from the second wing element at an end of the second wing element away from the central body.

6. The luggage rack of claim 5 wherein the fins extend upward from the wing elements.

7. The luggage rack of claim 1 wherein the fins extend downward from the wing elements.

* * * * *